March 21, 1967  G. V. SPRAGUE, JR., ET AL  3,309,724
METHODS OF SOLE ATTACHING
Filed April 1, 1964

Inventors
Gordon V. Sprague, Jr.
Conrad Rossitto
By their Attorney
Benjamin C. Pollard

United States Patent Office 3,309,724
Patented Mar. 21, 1967

3,309,724
METHODS OF SOLE ATTACHING
Gordon V. Sprague, Jr., Danvers, and Conrad Rossitto, Andover, Mass., assignors to United Shoe Machinery Corporation, Flemington, N.J., and Boston, Mass., a corporation of New Jersey
Filed Apr. 1, 1964, Ser. No. 356,519
5 Claims. (Cl. 12—142)

This invention relates to an improved method of cement attaching soles to shoe uppers.

The ordinary cement sole attaching process involves the application of a solvent-type cement both to the bottom of a shoe upper and to the attaching margin of the sole to be attached. This procedure has a number of difficulties among which are the matter of applying the cement to only those areas of the shoe upper desired to avoid the necessity for cleaning off cement from exposed portions of the shoe upper, and the extra cost involved in coating both upper and sole and in storing the upper and sole to allow evaporation of solvent.

Recently, there has been discovered a sole attaching method in which a band of molten cement is applied to the attaching margin of a sole and allowed to solidify. Thereafter, the bottom of the shoe upper is heated and the band of adhesive on the outsole is also heated to activate it. Thereafter the outsole is pressed against the upper to cause the activated adhesive to conform to and bond with the bottom of the shoe upper to hold the outsole on.

This process offers many advantages in cleanliness, elimination of steps and speed of operation. However, the process presents difficulties in the attaching of the very flexible soles used in many shoes. In particular, thin composition soles such as rubber or synthetic rubber or resin soles become objectionably soft and limp when subjected to heat to activate a cement band applied to them. These heat-softened soles deform and give an uneven, poor appearing sole bottom.

It is an object of the present invention to provide a simple method for securing such flexible soles to a shoe upper with a single application of hot-melt cement and to avoid sole deformation and unevenness so that a good bond character is secured.

To these ends and in accordance with a feature of the present invention, we have provided a sole attaching method in which the amount of sensible heat in the hot molten cement applied as a band to the attaching marginal surfaces of the sole is used to secure a sole binding condition in the adhesive when pressed promptly against the bottom of a shoe upper without activation. In this new procedure, the very flexibility of the soles which interferes with attaching by the previous hot-melt cement attaching process is taken advantage of to control cement flow in the pressing on of the sole.

The invention will be described further in connection with the attached drawings forming part of the disclosure in the present case in which.

Successful operation of the present process involves a balance and control of the temperature and quantity of molten adhesive deposited and its location on the attaching margin of the outsole extending to a line just short of the line at which upper and sole come together in the completed shoe and the flexibility and character of sole attaching pressure employed to bring together and conform the outsole to the bottom of the shoe upper.

The development of a strong bond by the adhesive can only be achieved where the adhesive is fluid for penetration and/or thorough wetting of the surface portions of the bottom of the shoe upper. Heat for maintaining the adhesive in the important fluid state is only the sensible heat carried by the molten adhesive and is determined by the temperature and quantity of adhesive applied. The greater the quantity of adhesive and the higher the temperature of the adhesive, the greater the sensible heat supply. However, the factors which contribute to the sensible heat supply are the same factors which contribute to objectionable squeeze out of the adhesive. The term "squeeze out" refers to the formation of a bead of adhesive along the line where the outsole and the upper come together. The presence of such a bead of squeezed-out adhesive is unsightly and is difficult to remove.

It has been found, however, that outsoles may be attached using a quantity of adhesive and an adhesive temperature effective to maintain the adhesive in fluid condition in a relation to penetrate and/or wet the bottom of a shoe upper without objectionable squeeze out by first applying pressure at peripheral areas. That is, with the flexible soles for attachment by the present process, and using a sole attaching press pad shaped so that the edge portions of the outsole are first contacted and pressed upward toward the bottom of the shoe upper, a sealing effect is obtained between the shoe upper and the sole adjacent the sole edge which resists flow of adhesive outward toward the sole edge. The molten adhesive is squeezed towards the center rather than being squeezed out, and an unsightly visible bead of cement is avoided. Leather soles having flexibility useful in this relation may have a thickness of up to 7 irons or, if a soft leather, somewhat thicker. Composition soles, for example, rubber, butadiene styrene copolymer rubber and the like and Shore A Durometer of 40 may have thickness preferably of 3 to 6 irons.

Figure 1:
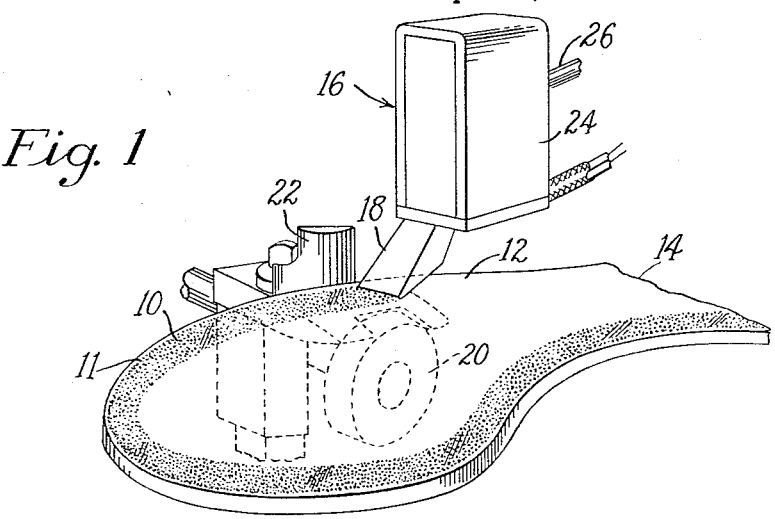
FIG. 1 is a diagrammatic angular view with parts broken away of a modified outsole cementer disposing a band of molten adhesive on the attaching margin of an outsole.

An illustrative procedure to aid in understanding the operation of the invention is the process of cement outsole attaching in which a band 10 of molten, solvent-free thermoplastic adhesive is spread on the attaching margin 12 of an outsole 14 by a modified outsole cementer 16, as shown in FIG. 1. The outsole cementer 16 comprises a nozzle 18 for applying and spreading the adhesive, a drive wheel 20 for moving the outsole 14 at a desired rate past the nozzle 18, and a guide 22 for maintaining the margin 12 of the outsole 14 in desired relation to the nozzle 18. The outer edge 11 of the band 10 of adhesive as applied is just inside, e.g. up to 1/16 inch inside the line of juncture between sole and upper in the completed shoe. This is important for good bonding of the outsole to the upper, but renders the procedure of the present invention doubly important to avoid squeeze out. In the device shown, molten cement for the nozzle 18 is supplied from a melting device 24 for handling a rod or strand 26 of thermoplastic adhesive; but it is to be understood that other molten adhesive supplies may be used where the nature of the adhesive permits.

As shown in FIG. 1, the cementer 16 applies a band 10 extending around at least the forward portion of the outsole 14 and it may extend around the entire margin of the outsole depending on the shoe construction involved. The deposited band 10 of adhesive may have a thickness of the order of about 0.005 to about 0.05 inch, preferably from about 0.008 to about 0.012 inch where the outsole is to be attached to a plastic upper and from about 0.01 to about 0.015 inch where the outsole is to be attached to a leather upper. While certain portions of this range of thickness of adhesive may not differ greatly from the thicknesses of bands of adhesive solution heretofore used in outsole cementing, the present solvent-free band of adhesive contains a significantly greater quantity of adhesive per unit thickness since it is 100% solids and is not diminished by the evaporation of volatile solvents. The adhesive is applied at a temperature substantially above its melting point to provide sensible heat for maintaining the adhesive in molten condition for a time adequate for sole attaching operations. The temperature should be at least 30° C. to 100° C. or more above the melting point of the adhesive. With such temperatures and with the adhesive band thickness, as much as 20 seconds may be available for assembling outsole and upper and pressing them together to form a permanent bond.

The thermoplastic adhesive useful for outsole attaching, according to the present method, involves a special combinaion of physical characteristics for effective operation. In general, the adhesive must be thermoplastic at least to the extent that it does not set up prior to completion of the heating and assembly operations involved in the present process. Resins having molecular weights preferably not over about 50,000 have been preferred in order that they may have the necessary fluidity for spreading, wetting and penetration. Mixtures of polymeric materials having molecular weights above this value, with resins of lower molecular weight may be compounded to approximate the physical properties of the preferred resins for use in the present process. It has been found desirable that the adhesive have a melting point (ball and ring) of from about 80° C. to about 200° C. and have a relatively wide temperature range, preferably a range of at least 20° C. in which it is visco-elastic when cooled from molten condition. The term "visco-elastic" refers to a condition in which the adhesive is somewhat rubbery but deformable and flowable under pressure, in order that it may permit limited movement, for example of the outsole 14 relative to an upper 30 so that accurate positioning of the outsole 14 relative to the upper 30 may be assured even after the outsole has come in contact. The temperature range in which the visco-elastic condition in the preferred adhesives occurs may be from about 10° C. to about 60° C. below the melting point of the adhesive; and the adhesive will harden to a strong, tough condition at temperatures at least as high as 50° C. Other important properties are relatively high strength, toughness and at least limited flexibility at room temperature in order that the adhesive may successfully withstand the severe stresses encountered in the use of a shoe.

Synthetic polymer resins which have been found useful include the polyesters from reaction and condensation of one or more dicarboxylic acids, for example terephthalates, isophthalates, sebacates, azelates and succinates, and glycols. Preferred polyesters include condensates of a lower alkylene glycol such as ethylene glycol or butylene glycol with dicarboxylic acids, for example, condensates of 1,4 butane diol with mixed terephthalate and isophthalate components in the molar ratio of from about 1:1 to about 4:1 and condensates of mixed ethylene glycol and 1,4 butane diol and mixtures of these with mixed terephthalate, isophthalate and sebacate or azelate components in percentages of 40% to 60% terephthalate, 20% to 50% isophthalate and 10% to 20% sebacate or azelate. Polyesteramides, for example adipic polyesteramides in which the hydroxy component is 1,6 hexane diol, 1,4 butane diol or ethylene glycol, stereospecific catalyzed polymers of vinyl alkyl ethers where the alkyl group has from 1 to 4 carbon atoms, polymers and copolymers of lower alkyl acrylates and methacrylates are also useful.

Figure 2:
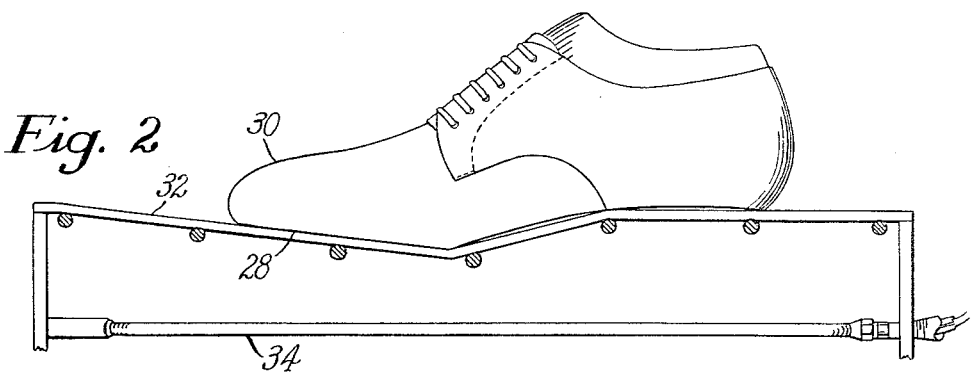
FIG. 2 is a diagrammatic elevational view showing radiant heating of the bottom of a shoe upper.

The outsole 14 is assembled with the band 10 of hot molten adhesive on its attaching margin 12 against the heated sole attaching surface 28 of the shoe upper 30. The attaching surface 28 of the shoe upper 30 may be heated by disposing the upper on a rack 32 in spaced relation to a radiant heating unit 34 as shown in FIG. 2. With plastic upper materials, for example plasticized vinyl chloride polymers and copolymers, it is desirable that the attaching surface of the upper be heated to about 110° to about 140° F., and with leather uppers temperatures of 150° to 175° F. are preferred.

Figure 3:
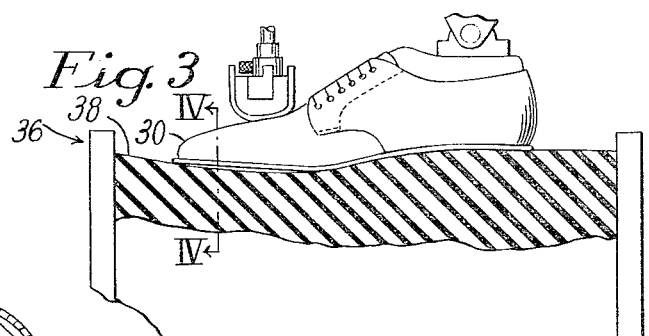
FIG. 3 is a diagrammatic elevational view showing the initial action in the bonding of an outsole to an upper in a sole attaching press.
Figure 4:
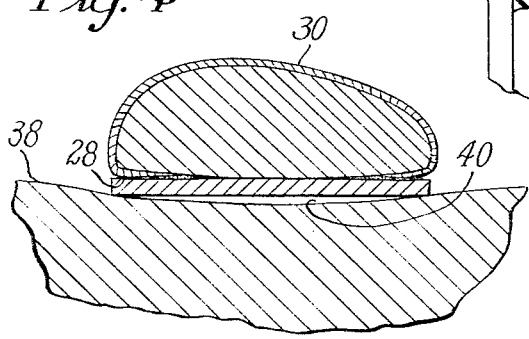
FIG. 4 is a diagrammatic sectional elevational view taken on the line IV—IV of FIG. 3 showing the relation of the outsole to the upper produced by the initial action of the shaped press pad of the sole attaching press.

The assembled shoe upper 30 and outsole 14 are placed promptly in a sole attaching press 36 (see FIG. 3) and subjected to sole attaching pressure. As shown in FIG. 4, the sole attaching press pad 38 is formed with a concave pressing surface 40 so that in bringing the shoe upper 30 toward the press pad 38 with the outsole 14 between them, the outsole 14 is first pressed upward along its edges. As movement continues, pressure is applied over further portions of the outsole to conform and press the outsole against the shoe bottom; but the greatest pressure is exerted between the outsole 14 and peripheral portions of the bottom of the shoe upper 30 to form a seal which resists outward flow of molten adhesive so that the molten flowable adhesive between the outsole 14 and the shoe bottom 28 are caused to flow inward rather than outward. The molten adhesive will cool and harden quickly and sole attaching pressure may then be released and the shoe removed from the press 36 within a few seconds after the sole 14 has been pressed into all over engagement with the attaching surface 28 of the shoe upper 30.

The process described is applicable both to leather outsoles and to natural or synthetic rubber outsole materials. The process is particularly valuable with thin flexible soles, for example 6 or 7 iron leather soles and 3 to 6 iron natural or synthetic rubber outsole materials. With natural or synthetic rubber outsole materials in many cases it is desirable to provide a primer coat on the attaching surface of the outsole to improve the union between the thermoplastic adhesive and the outsole. Suitable primer compositions include a solution of chlorinated rubber in a volatile organic solvent or a solution of a relatively stable polyisocyanate, for example, a polyarylene polyisocyanate commercially available as "PAPI."

The following examples are given to aid in understanding the invention. The invention is not restricted to the particular materials, proportions or procedural conditions employed in the axamples.

*Example I*

A polyester was prepared by the reaction of 1,4 butane diol with dimethyl terephthalate, isophthalic acid and azelaic acid, these three materials being used in molar ratios of 4.4:4.4:1.3. The condensation was carried out to form a resinous material having a meltnig point of about 120° C. (ball and ring). This resin was formed into a rod of about 3/16" thickness and supplied to a melting and applying device adjusted to deposit a band about 1/2" wide, about 0.008" to about 0.010" in thickness and a temperature of about 245°.

A four iron outsole of GR–S type synthetic rubber was provided with a band of molten adhesive at a deposition temperature of 245° C. by the melting and applying device. The band was disposed on the outsole with its outer edge about 1/32 inch inside the line of juncture between outsole and upper in the shoe to be made.

The bottom of a fabric-backed polyvinyl chloride plastic shoe upper was exposed to radiant heat for about four seconds to raise the temperature of the attaching surface of the shoe upper to about 120° to 130° F. and the outsole was spotted against this upper directly after deposition of adhesive on the outsole and the assembly placed in a sole attaching press equipped with a concave surfaced press pad. Pressure was applied to the extent of about 200 lbs. per sq. inch on the assembly and after 8 seconds the pressure was removed. On examination it was found that the sole was strongly attached to the shoe upper and that there had been no squeeze out of adhesive.

*Example II*

The procedure of Example I was repeated but 15 seconds were allowed to elapse between the application of adhesive to the outsole and the spotting of the outsole on the upper and the application of attaching pressure. In this also the sole was strongly attached to the shoe upper and there was no squeeze out of adhesive.

*Example III*

The procedure of Example I was repeated using a six iron leather outsole. In this case also there was no squeeze out of adhesive and the sole was strongly and uniformly bonded to the shoe upper.

*Example IV*

The procedure of Example I was repeated but using a leather shoe upper and using a cement band thickness on the outsole of 0.011 to 0.013 inch. In this case the radiant heating of the attaching surface of the shoe was continued to raise the temperature of the attaching surface to about 160° F. Excellent sole attaching was obtained in which there was no squeeze out of the adhesive and the sole attaching bond was strong and uniform.

Having thus described our invention, what we claim as new and desire to secure by Letters Patent of the United States is:

1. The method of attaching a sole to a shoe upper comprising the steps of applying to a flexible outsole a band from about 0.005 to about 0.05 inch in thickness of thermoplastic substantially solvent-free synthetic polymer resin adhesive in hot fluid molten condition on the attaching marginal area of said outsole, the outer edge of said band being just inside the line of juncture between said sole and said shoe upper, and said adhesive having a melting point of from 80° to 200° C. and hardening to a strong, tough condition at a temperature of at least 50° C., heating the bottom of the shoe upper, assembling said outsole against said heated bottom while said adhesive is retained in molten adhesive condition by the sensible heat derived from the quantity and temperature of the adhesive applied, applying pressure first against marginal portions of said outsole to bend upward the portions of said sole adjacent the sole edge and press them against the shoe upper bottom to form a seal between said portions and the shoe upper bottom to resist flow of adhesive outward toward said sole edge, and thereafter applying pressure against further portions of said sole to squeeze said adhesive between said sole and said bottom of the shoe upper to force the molten adhesive to flow into adhesive engagement with said bottom and hardening said adhesive by dissipation of heat while maintaining pressure on said sole.

2. The method of attaching a sole to a leather shoe upper comprising the steps of applying to a flexible outsole, a band from about 0.01 to about 0.015 inch in thickness of thermoplastic substantially solvent-free synthetic polymer resin adhesive in hot fluid molten condition on the attaching marginal area of said outsole, the outer edge of said band being just inside the line of juncture between said sole and said shoe upper and said adhesive having a melting point of from 80° C. to 200° C. and hardening to a strong, tough condition at a temperature of at least 50° C., subjecting the bottom of the shoe upper to radiant heat to bring the surface to a temperature of from about 150° F. to 175° F., assembling said outsole against said heated bottom while said adhesive is retained in molten adhesive condition by the sensible heat derived from the quantity and temperature of the adhesive applied, applying pressure first against marginal portions of said outsole to bend upward the portion of said sole adjacent the sole edge and press them against the shoe upper bottom to form a seal between said portions and the shoe upper bottom to resist flow of adhesive outward toward said sole edge and thereafter applying pressure against further portions of said sole to squeeze said adhesive between said sole and said bottom of the shoe upper to force the molten adhesive to flow into adhesive engagement with said bottom, and hardening said adhesive by dissipation of heat while maintaining pressure on said sole.

3. The method of attaching a sole to a leather shoe upper comprising the steps of applying to a flexibe outsole, a band from about 0.01 to about 0.015 inch in thickness of thermoplastic substantially solvent-free synthetic polymer resin adhesive in hot molten condition at a temperature at least 30° C. above the melting point on the attaching marginal area of said outsole, the outer edge of said band being up to about 1/16" inside the line of juncture between said sole and said shoe upper and said adhesive having a melting point of from 80° C. to 200° C. and hardening to a strong, tough condition at a temperature of at least 50° C., subjecting the bottom of the shoe upper to radiant heat to bring the surface to a temperature of from about 150° F. to 175° F., assembling said outsole against said heating bottom while said adhesive is retained in molten adhesive condition by the sensible heat derived from the quantity and temperature of the adhesive applied, applying pressure first against marginal portions of said outsole to bend upward the portion of said sole adjacent the sole edge and press them against the shoe upper bottom to form a seal between said portions and the shoe upper bottom to resist flow of adhesive outward toward said sole edge and thereafter applying pressure against further portions of said sole to squeeze said adhesive between said sole and said bottom of the shoe upper to force the molten adhesive to flow into adhesive engagement with said bottom, and hardening said adhesive by dissipation of heat while maintaining pressure on said sole 4. The method of attaching a sole to a plastic shoe upper comprising the steps of applying to a flexible outsole a band of about 0.008 to about 0.012 inch in thickness of a thermoplastic substantially solvent-free synthetic polymer resin adhesive in hot fluid molten condition on the attaching marginal area of said outsole, the outer edge of said band being just inside the line of juncture between said sole and said shoe upper and said adhesive having a melting point of from 80° C. to 200 C. and hardening to a strong, tough condition at a temperature of at least 50° C., subjecting the bottom of the shoe upper to radiant heat to bring the surface to a temperature of from about 110° F. to about 140° F., assembling said outsole against said heated bottom while said adhesive is retained in molten adhesive condition by the sensible heat derived from the quantity and temperature of the adhesive applied, applying pressure first against marginal portions of said outsole to bend upward the portion of said sole adjacent the sole edge and press them against the shoe upper bottom to form a seal between said portions and the shoe upper bottom to resist flow of adhesive outward toward said sole edge and thereafter applying pressure against further portions of said sole to squeeze said adhesive between said sole and said bottom of the shoe upper to force the molten adhesive to flow into adhesive engagement with said bottom, and hardening said adhesive by dissipation of heat while maintaining pressure on said sole.

5. The method of attaching a sole to a plastic shoe upper comprising the steps of applying to a flexible outsole a band of about 0.008 to about 0.012 inch in thickness of a thermoplastic substantially solvent-free synthetic polymer resin adhesive in hot fluid molten condition at a temperature at least 30° C. above its melting point on the attaching marginal area of said outsole, the outer edge of said band being up to about 1/16" inside the line of juncture between said sole and said shoe upper and said adhesive having a melting point of from 80° C. to 200° C. and hardening to a strong, tough condition at a temperature of at least 50° C., subjecting the bottom of the shoe upper to radiant heat to bring the surface to a temperature of from about 110° F. to about 140° F., assembling said outsole against said heated bottom while said adhesive is retained in molten adhesive condition by the sensible heat derived from the quantity and temperature of the adhesive applied, applying pressure first against marginal portions of said outsole to bend upward the portion of said sole adjacent the sole edge and press them against the shoe upper bottom to form a seal between said portions and the shoe upper bottom to resist flow of adhesive outward toward said sole edge and thereafter applying pressure against further portions of said sole to squeeze said adhesive between said sole and said bottom of the shoe upper to force the molten adhesive to flow into adhesive engagement with said bottom, and hardening said adhesive by dissipation of heat while maintaining pressure on said sole.

References Cited by the Examiner
UNITED STATES PATENTS

| | | | |
|---|---|---|---|
| 1,103,937 | 7/1914 | Brothers | 12—142 X |
| 1,937,074 | 11/1933 | Vicente. | |
| 2,399,410 | 4/1946 | Walsh | 12—142 |
| 3,168,754 | 2/1965 | Rossitto | 12—142 |

JORDAN FRANKLIN, *Primary Examiner.*

H. H. HUNTER, *Assistant Examiner.*